US008859687B2

(12) United States Patent
Mruk et al.

(10) Patent No.: US 8,859,687 B2
(45) Date of Patent: *Oct. 14, 2014

(54) FUNCTIONTIONALIZED ELASTOMER

(75) Inventors: Ralf Mruk, Lipperscheid (LU); Frank Schmitz, Bissen (LU); Robert Fokko Roskamp, Triet (DE); Alexandra Hermann, Mainz (DE); Rudolf Wilhelm Zentel, Nierstein (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 251 days.

This patent is subject to a terminal disclaimer.

(21) Appl. No.: 13/332,934

(22) Filed: Dec. 21, 2011

(65) Prior Publication Data

US 2013/0165596 A1    Jun. 27, 2013

(51) Int. Cl.
*C08C 19/20* (2006.01)
*C08C 19/22* (2006.01)

(52) U.S. Cl.
USPC .............. 525/332.9; 525/331.9; 525/333.1; 525/333.2; 525/333.5; 525/333.6; 525/343; 525/348; 525/350; 525/351; 525/375

(58) Field of Classification Search
USPC .......... 525/331.9, 332.9, 333.1, 333.2, 333.5, 525/333.6, 343, 348, 350, 351, 375
See application file for complete search history.

(56) References Cited

U.S. PATENT DOCUMENTS

| 4,229,308 | A | * | 10/1980 | Brulet et al. | 508/221 |
|---|---|---|---|---|---|
| 4,357,446 | A | * | 11/1982 | Matoba | 525/281 |
| 4,937,290 | A | | 6/1990 | Bauer et al. | 525/184 |
| 6,365,668 | B1 | | 4/2002 | Scholl et al. | 524/575 |
| 7,847,019 | B2 | | 12/2010 | David et al. | 525/54.1 |
| 2004/0063884 | A1 | | 4/2004 | Halasa et al. | |
| 2004/0116635 | A1 | | 6/2004 | Halasa et al. | |
| 2010/0230158 | A1 | | 9/2010 | Hase et al. | 174/72 A |

FOREIGN PATENT DOCUMENTS

| CN | 101367892 A | 2/2009 | |
|---|---|---|---|
| EP | 0316255 A2 | 5/1989 | |
| FR | 2416908 A1 | 9/1979 | |
| JP | 2008163239 | 7/2008 | C08F 8/00 |

OTHER PUBLICATIONS

Brummelhuis et al., Macromolecules 41 (2008) 9946-9947.*
http://en.wikipedia.org/wiki/Cysteine; May 2014.*
EPO Search Report dated Feb. 20, 2013.
Schubert et al., Angew. Chem. Int. Ed., 2002, vol. 41, p. 2892-2926.
Chinese Search Report, application 201210561475.9, May 2014.
Kryger, Matt, "Applications of Thiol-ENE Coupling", *Abstract*, Dec. 11, 2008, pp. 1-8, Retrieved from the Internet, http://www.chemistry.illinois.edu/research/organic/seminar_extracts/2008_2009/Matt_Kryger_Chem535_FA08_Abstract.pdf *whole document*.
Moad, Graeme et al., "Living Radical Polymerization by the RAFT Process", *Australian J. Chemistry* 2005, vol. 58, pp. 379-410, Retrieved from the Internet: URL: http://www.publish.csiro.au/journals/ajc *whole document*.
Schubert, U.S. et al., "Macromolecules Containing Bipyridine and Terpyridine Metal Complexes: Towards Metallosupramolecular Polymers", Angew. Chem. Int. Ed. 2002, 41, 2892-2926.
Gerber, R. Eric et al., "β-Mercaptopropionitrile (2-Cyanoethanethiol)", *Organic Synthesis*, vols. 10 and 77, pp. 234 and 186, (2000).
Lutz, Jean-Francois, "Modular Chemical Tools for Advanced Macromolecular Engineering", *Polymer*, vol. 49, Issue 4, Feb. 18, 2008, pp. 817-824.
Harrisson, Simon, "Radical-Catalyzed Oxidation of Thiols by Trithiocarbonate and Dithioester RAFT Agents: Implications for the Preparation of Polymers with Terminal Thiol Functionality", *Macromolecules*, Jan. 13, 2009.
Ohr, Kristi et al., "Redox Behavior of Phenyl-Terpyridine-Substituted Artificial Oligopeptides Cross-Linked by Co and Fe", *Inorganic Chemistry*, pp. 965-974, vol. 46, No. 3 2007.
Carlise, Joseph E. et al., "Side-Chain Functionalized Polymers Containing Bipyridine Coordination Sites: Polymerization and Metal-Coordination Studies", *Journal of Polymer Science: Part A: Polymer Chemistry*, vol. 42, 2973-2984 (2004).
Brummelhuis, Niels ten et al., "Supporting Information to Thiol#Ene Modification of 1, 2-Polybutadiene Using UV Light or Sunlight", pp. S1-S5, (2008).
Brummelhuis, Niels ten et al., "Thiol#Ene Modification of 1,2-Polybutadiene Using UV Light or Sunlight", *Macromolecules*, 2008, 41, pp. 9946-9947, Retrieved from the Internet: URL: http://www.pubs.acs.org *whole document*.

* cited by examiner

*Primary Examiner* — Roberto Rabago
(74) *Attorney, Agent, or Firm* — John D. DeLong

(57) ABSTRACT

The present invention is directed to a functionalized elastomer comprising: a polymeric backbone chain derived from a monomer comprising at least one conjugated diene monomer and optionally at least one vinyl aromatic monomer; and a functional group bonded to the backbone chain, the functional group comprising a multidentate ligand capable of complexing with a metal ion.

6 Claims, 12 Drawing Sheets

FUNCTIONTIONALIZED ELASTOMER

BACKGROUND

It is important for rubbery polymers that are used in tires, hoses, power transmission belts and other industrial products to have good compatibility with fillers, such as carbon black and silica. To attain improved interaction with fillers such rubbery polymers can be functionalized with various compounds, such as amines. U.S. Pat. No. 4,935,471 discloses a process for preparing a polydiene having a high level of affinity for carbon black which comprises reacting a metal terminated polydiene with a capping agent selected from the group consisting of (a) halogenated nitriles, (b) heterocyclic aromatic nitrogen containing compounds, and (c) alkyl benzoates. The capping agents disclosed by U.S. Pat. No. 4,935,471 react with metal terminated polydienes and replace the metal with a terminal cyanide group, a heterocyclic aromatic nitrogen containing group or a terminal group which is derived from an alkyl benzoate. For example, if the metal terminated polydiene is capped with a nitrile, it will result in the polydiene chains being terminated with cyanide groups. The use of heterocyclic aromatic nitrogen containing compounds as capping agents can result in the polydiene chains being terminated with a pyrrolyl group, an imidazolyl group, a pyrazolyl group, a pyridyl group, a pyrazinyl group, a pyrimidinyl group, a pyridazinyl group, an indolizinyl group, an isoindolyl group, a 3-H-indolyl group, a cinnolinyl group, a pteridinyl group, a β-carbolinyl group, a perimidinyl group, a phenanthrolinyl group or the like.

SUMMARY

The present invention is directed to a functionalized elastomer comprising: a polymeric backbone chain derived from a monomer comprising at least one conjugated diene monomer and optionally at least one vinyl aromatic monomer; and a functional group bonded to the backbone chain, the functional group comprising a multidentate ligand capable of complexing with a metal ion.

DETAILED DESCRIPTION

Figure 1:
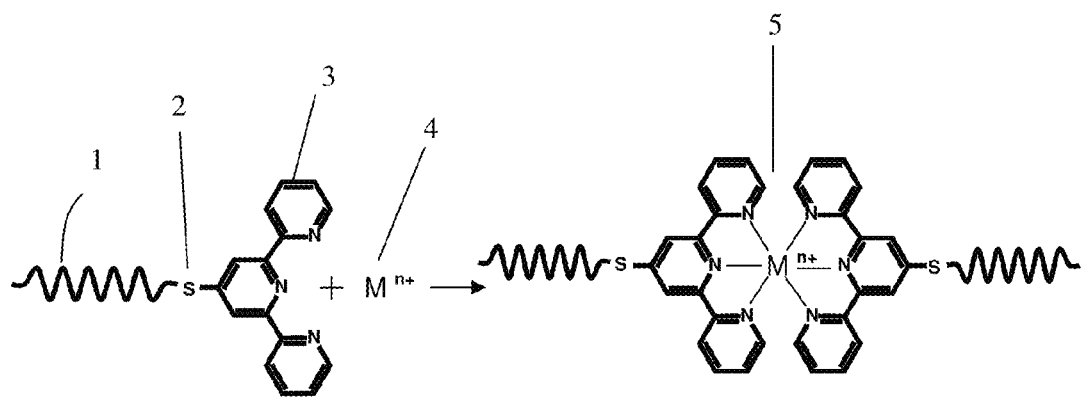
FIG. 1 shows a schematic representation of a coordination complex between a metal ion and a functionalized elastomer.

There is disclosed a functionalized elastomer comprising: a polymeric backbone chain derived from a monomer comprising at least one conjugated diene monomer and optionally at least one vinyl aromatic monomer; and a functional group bonded to the backbone chain, the functional group comprising a multidentate ligand capable of complexing with a metal ion.

In one embodiment, the functionalized elastomer has the structure I

where X is a polymer derived from a monomer comprising at least one conjugated diene monomer and optionally at least one vinyl aromatic monomer; Z is a functional group comprising a multidentate ligand capable of complexing with a metal ion; Y is a divalent group bonded to both X and Z; and n is the number of —[—Y—Z] groups bonded to X.

In one embodiment, the polymer X is a diene based elastomer comprising at least one carbon-carbon double bond. The phrases "rubber or elastomer containing olefinic unsaturation" or "diene based elastomer" as used herein are equivalent and are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic rubbers are the homopolymerization products of butadiene and its homologues and derivatives, for example, methylbutadiene (i.e., isoprene), dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The term "phr" as used herein, and according to conventional practice, refers to "parts by weight of a respective material per 100 parts by weight of rubber, or elastomer."

In one embodiment, the functional group Z comprising a multidentate ligand capable of complexing with a metal ion, includes but is not limited to substituted or unsubstituted bipyridinyl groups, substituted or unsubstituted terpyridinyl groups, substituted or unsubstituted phenanthrolinyl groups, and substituted or unsubstituted pyrazinyl groups, and the like.

In one embodiment, the functional group Z comprising a multidentate ligand capable of complexing with a metal ion is selected from the group consisting of substituted or unsubstituted bipyridinyl groups, substituted or unsubstituted terpyridinyl group, substituted or unsubstituted phenanthrolinyl group, or substituted or unsubstituted pyrazinyl group.

In one embodiment, the functional group Z comprising a multidentate ligand capable of complexing with a metal ion is a substituted or unsubstituted terpyridinyl group of formula II, or substituted or unsubstituted bipyridinyl group of formula III or IV

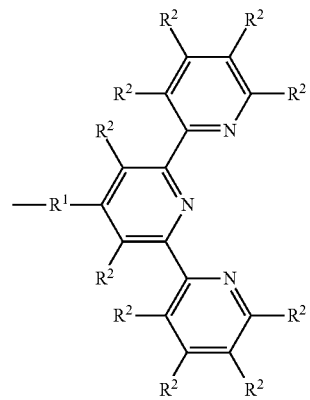

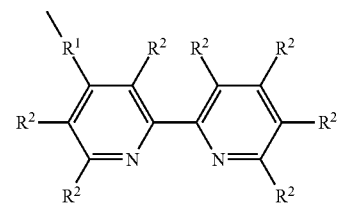

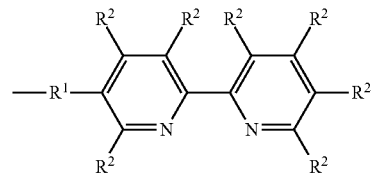

where $R^1$ forms the linkage from Z to Y in formula I and $R^1$ is a covalent bond, C2 to C8 linear alkylene, arylene, alkyl substituted arylene, aryl substituted alkylene, thioalkylene, or thioarylene, and $R^2$ are independently selected from the group consisting of hydrogen, C2 to C6 linear alkyl, and C2 to C6 branched alkyl.

In one embodiment, the functional group Z comprising a multidentate ligand is a substituted or unsubstituted 2,2';6', 2"-terpyridinyl group.

In one embodiment, the functional group Z comprising a multidentate ligand is a substituted or unsubstituted 2,2'-bipyridinyl group.

In one embodiment, the —[Y—Z] group is selected from the group consisting of 6-(2,2';6',2"-terpyridin-4'-ylsulfanyl)hexyl-1-sulfanyl, 2,2';6',2"-terpyridin-4'-ylsulfanyl, and 4-(2,2';6',2"-terpyridin-4'-yl)phenylmethylsulfanyl.

Y is a divalent group bonded to both X and Z. In one embodiment, Y is sulfur or oxygen. In one embodiment, Y is sulfur.

Generally, Y originates as a terminal functional group of the polymer Z capable of reacting with a carbon-carbon double bond of the polymer X. Thus, as it exists in the copolymer Z links X to Z. In one embodiment, the terminal functional group is a thiol group. Such a terminal functional group may be incorporated into the polymer Z during polymerization, for example, through use of a suitable chain transfer agent or terminating agent as is known in the art.

The number n of —[Y—Z] groups bonded to X ranges from about 2 to about 30 in a given copolymer molecule.

By "capable of complexing with a metal ion," it is meant that as part of the functionalized elastomer of formula I, the functional group Z may form a complex structure with a metal ion; such a metal ion may be present for example by addition of a metal salt during mixing of the functionalized elastomer in a rubber composition. Suitable metal ions include those known to complex with ligands, including but not limited to zinc ions, copper ions, iron ions, nickel ions, ruthenium ions, and the like. The complexation of the functional group Z with a metal ion may exist as a complex between a single functional group Z and the metal ion, or as a coordination complex between 2 or more functional groups Z and a metal ion. FIG. 1 shows schematically such a coordination complex between an elastomer (1) shown as a wavy line functionalized through a sulfur linkage (2) with a terpyridine group (3) as the ligand. The addition of a metal ion M (4) is shown to form a coordination complex (5) between the metal ion M (4) and two of the ligand groups (3) of the functionalized elastomer.

The functionalized elastomer may be produced by various methods. In one embodiment, the functionalized elastomer may be produced by functionalizing the polymer X with functional group Z comprising a multidentate ligand capable of complexing with a metal ion. A convenient way for the functionalization of a variety of elastomers is the thiol-ene reaction during which alkene moieties being present in the elastomers are transformed into thioethers by reaction with thiols. This reaction proceeds preferably with vinyl groups as they are present in styrene-butadiene rubbers, butadiene rubbers, and polyisoprene rubbers. In order to allow the functionalization of the elastomers, the $-[-Y-Z]$ grouping, where Y is sulfur, may be linked to the elastomer X through reaction of the thiol HS—Z with vinyl groups of the elastomer X to form a thioether of formula I, where Y is sulfur. Further details of the thiol-ene reaction as it relates to elastomers may be found by reference to U.S. Pat. Nos. 6,365,668 and 7,847,019, both fully incorporated by reference herein.

One step of the method to produce the functionalized elastomer is to obtain as a first polymer, an elastomer comprising at least one carbon-carbon double bond.

A second step of the method is obtaining a functionalizing agent including a functional group Z comprising a multidentate ligand capable of complexing with a metal ion, and a functional group Y capable of reacting with the carbon-carbon double bond of the first polymer.

A third step of the method is reacting the first polymer with the functionalizing agent to form the functionalized elastomer. During reacting of the functionalizing agent with the first polymer, the functional group Z is linked to the first polymer through reaction of the functional group Y with the unsaturated carbon-carbon bond of the first polymer.

In one embodiment, the functionalizing agent is reacted with the first polymer in a suitable solvent in the presence of a free-radical initiator via a thiol-ene reaction as is known in the art, see for example *Macromolecules* 2008, 41, 9946-9947. In one embodiment, the free-radical initiator is selected from the group consisting of 2,4,6-Trimethylbenzoyldiphenylphosphine oxide and azobisisobutyonitrile (AIBN).

The invention is further illustrated by the following non-limiting examples.

Example 1

In this example, functionalization of a styrene-butadiene rubber with 2-mercaptonaphthalene is illustrated to demonstrate the thiol-ene reaction.

To test the reactivity and reaction conditions of the styrene-butadiene rubber in a thiol-ene reaction, some reactions with a model thiol were made. The chosen thiol was 2-mercaptonaphthalene, from Aldrich.

Figure 2:
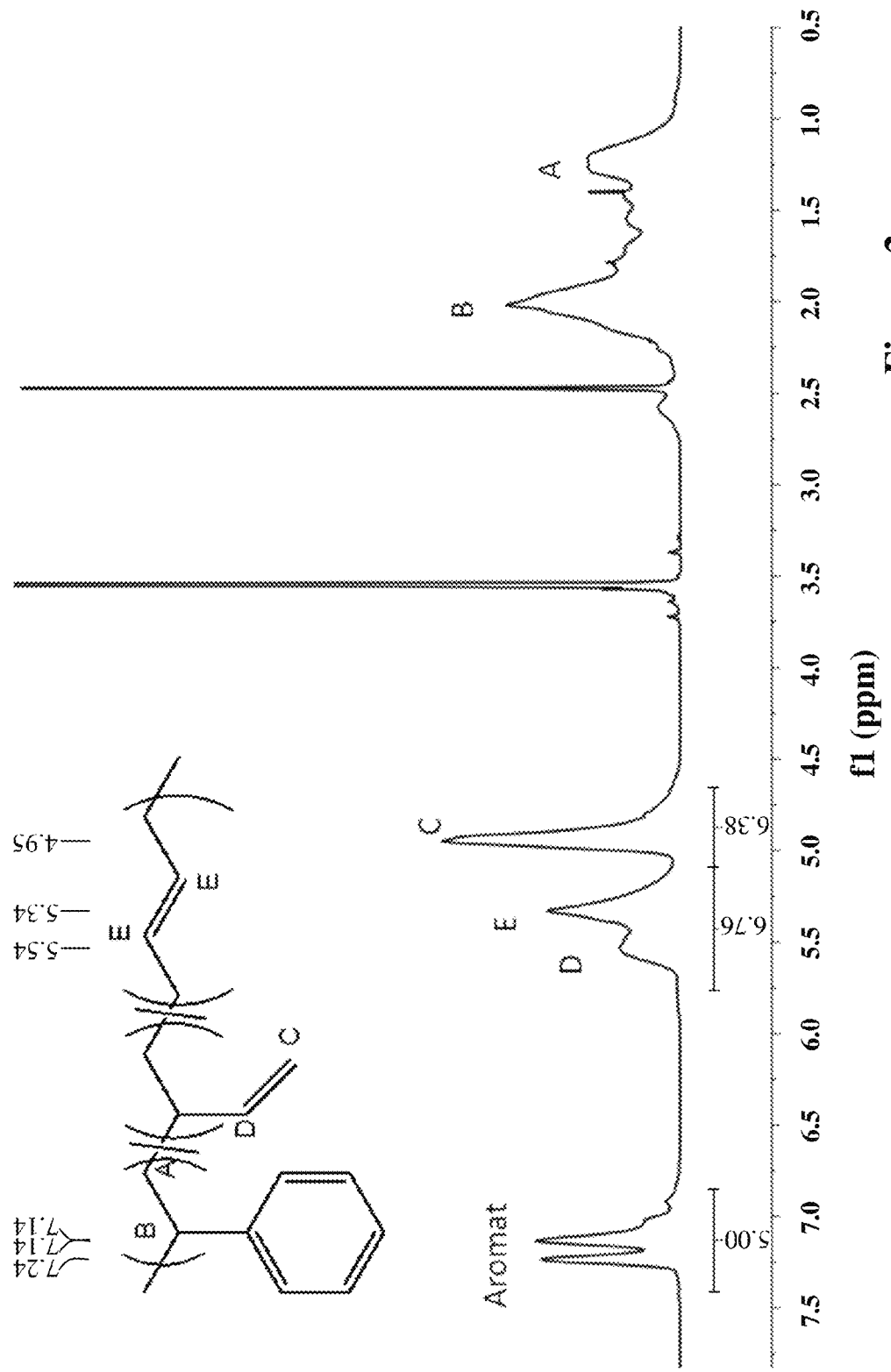
FIG. 2 shows the $^1$H-NMR spectrum of a styrene-butadiene elastomer.

The properties of the used styrene-butadiene rubber are summarized in Table 1. FIG. 2 shows the $^1$H-NMR spectrum of the elastomer.

TABLE 1

| | |
|---|---|
| Mooney (avg) | 27.6 |
| Finished Mooney | 23.1 |
| Tg (onset)/° C. | −21.74 |
| Tg (midpoint)/° C. | −17.52 |
| FTIR Styrene | 25.392 |
| FTIR Vinyl | 47.506 |
| FTIR Cis | 13.144 |
| FTIR Trans | 13.058 |
| Mn/g/mol | 124122 |
| Mw/g/mol | 207982 |
| Mz/g/mol | 327454 |
| PDI | 1.67 |

Synthesis of 2-mercaptonaphthalene Functionalized Rubber

This compound was synthesized twice, once with AIBN as initiator for the reaction and once with an acylphosphine oxide photoinitiator (Lucirin TPO).

For the reaction initiated by AIBN, 1 g of SBR was dissolved in 50 ml dry THF and 1.40 g of 2-mercaptonaphthalene and 0.14 g AIBN were added. The solution was degassed under a stream of argon for 2 hours and was then placed in a preheated oil bath at 75° C. The reaction was stirred for 14.5 hours at that temperature.

For the reaction initiated by the photoinitiator, a mixture of 1 g SBR, 1.40 g 2-mercaptonaphthalene and 0.30 g Lucirin TPO was degassed under a stream of argon for 2 hours and then was placed under a UV-lamp (320-380 nm) for 14.5 hours.

To make sure that no free thiol was present in the product, both reaction mixtures were dialyzed against THF for two days. Afterwards the solvent was evaporated and the product was dried under vacuum.

Figure 3:
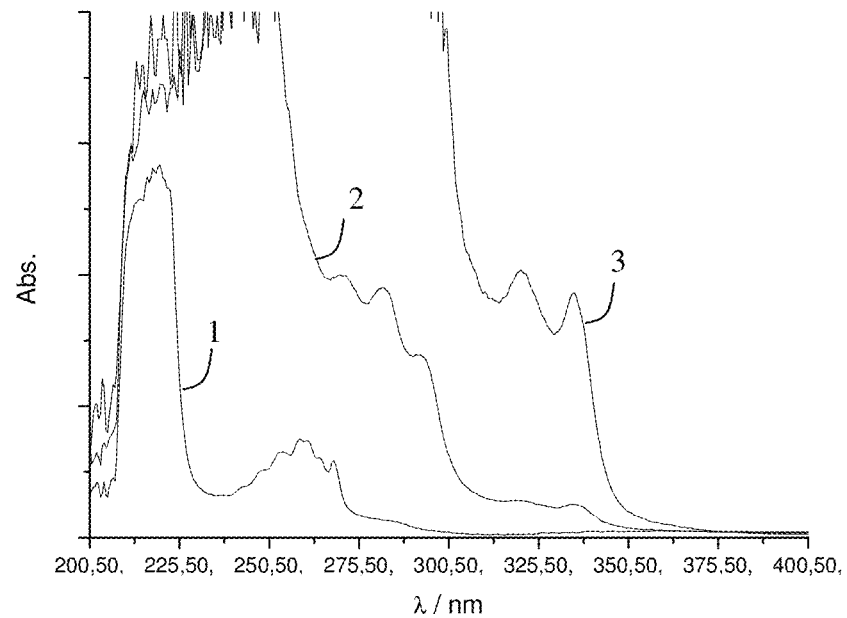
FIG. 3 shows the UV-vis spectrum of a styrene-butadiene elastomer before and after the reaction with 2-mercaptonaphthalene and the spectrum of the pure thiol.
Figure 4:
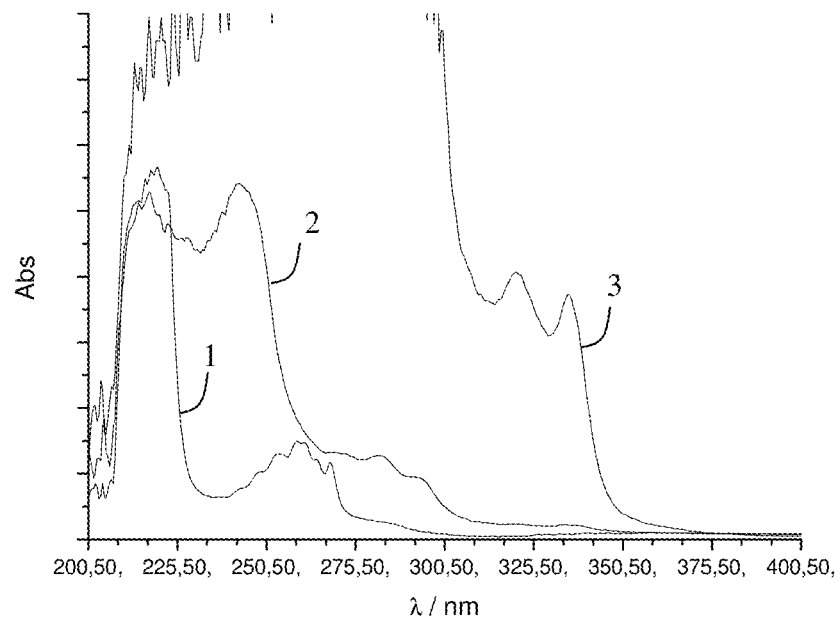
FIG. 4 shows the UV-vis spectrum of a styrene-butadiene elastomer before and after the reaction with 2-mercaptonaphthalene and the spectrum of the pure thiol.

FIG. 3 shows the UV-vis spectrum of the elastomer before (1) and after the reaction with 2-mercaptonaphthalene (2) and the spectrum of the pure thiol (3). Here the photoinitiator was used. FIG. 4 shows the same for the reaction which was initiated by AIBN, with the UV-vis spectrum of the elastomer before (1) and after the reaction with 2-mercaptonaphthalene (2) and the spectrum of the pure thiol (3).

Figure 5:
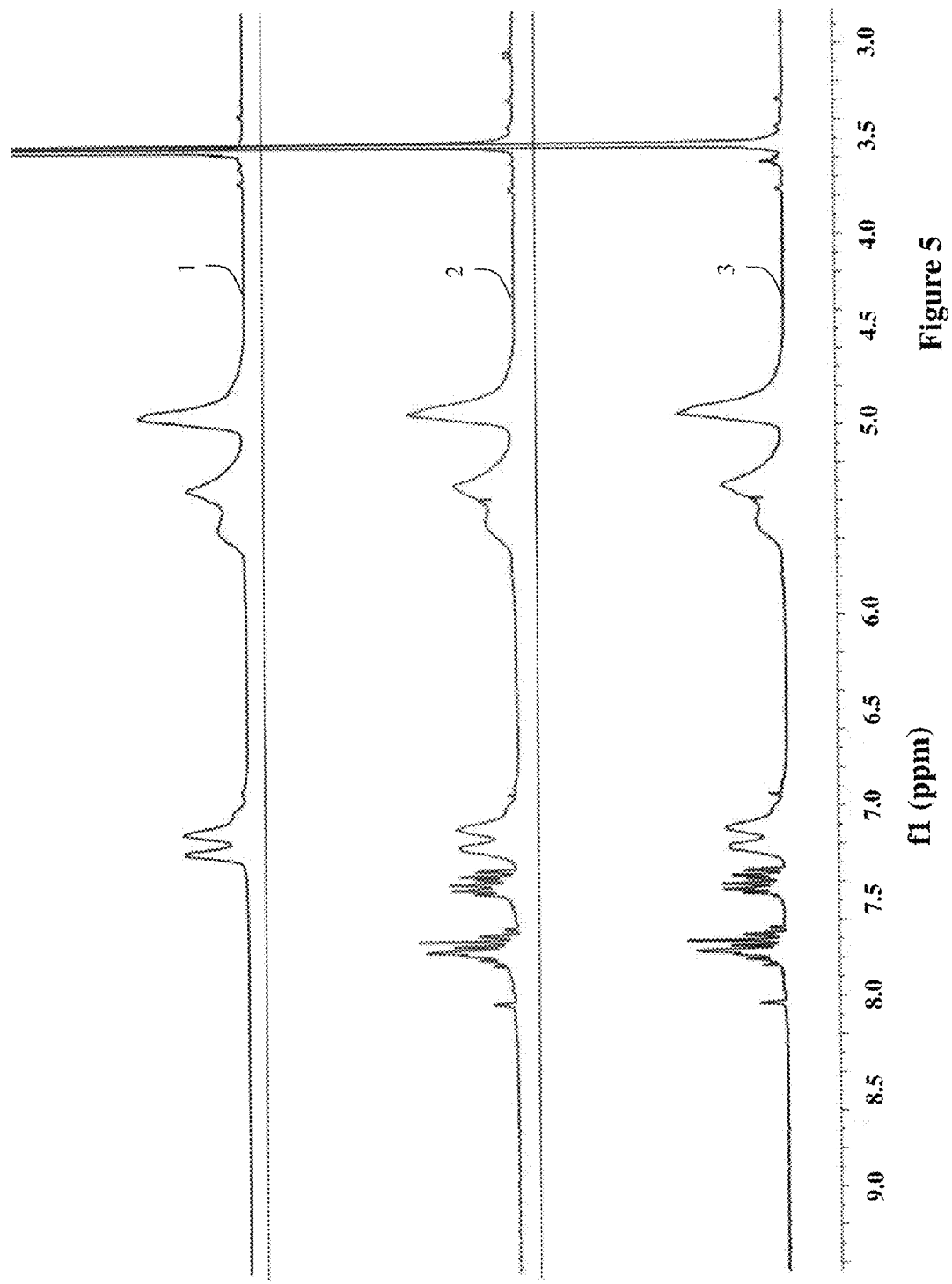
FIG. 5 shows the $^1$H-NMR spectrum of a styrene-butadiene elastomer before and after reaction with a thiol in the presence of different initiators.
Figure 6:
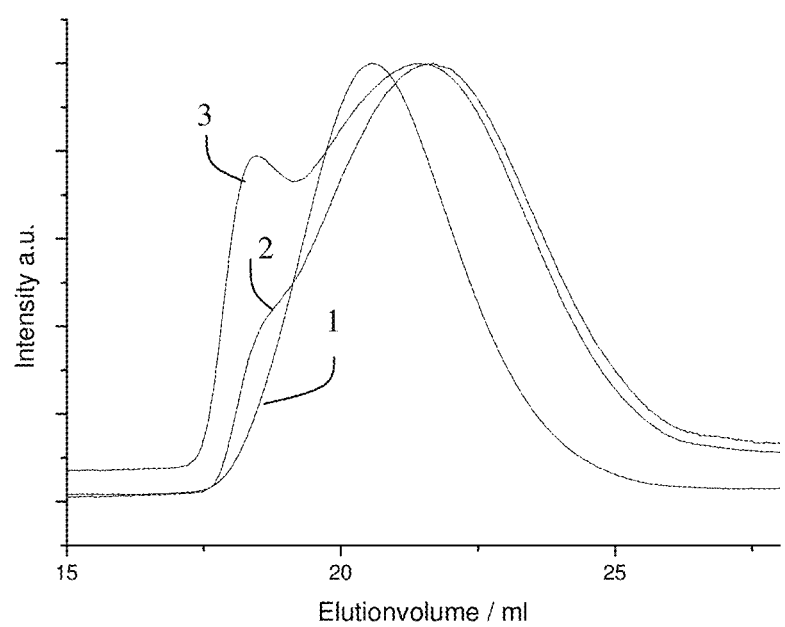
FIG. 6 shows a GPC-measurement for a styrene-butadiene elastomer, and the elastomer functionalized with a thiol in the presence of different initiators.

FIG. 5 shows the $^1$H-NMR spectrum of the elastomer before (1) and after reaction with the thiol in the presence of AIBN (2) and Lucirin (3). Compared to the $^1$H-NMR spectrum of the unfunctionalized rubber, there is an increase of the signals for the aromatic protons and a decrease for the vinyl groups after the polymer analogous reaction, confirming that the SBR was successfully functionalized with 2-mercaptonaphthalene. GPC-measurement (in THF) as shown in FIG. 6 for the SBR (1), the SBR functionalized in the presence of AIBN (2) and in the presence of Lucirin (3) confirmed that the product is not greatly cross linked. As seen in FIG. 6, especially the curve of the AIBN-initiated product (2) shows very little cross linking (small shoulder), so that the decrease of the signal of vinyl protons can be assigned to functionalization.

Example 2

In this example, functionalization of a styrene-butadiene rubber with 6-(2,2';6',2"-terpyridin-4'-ylsulfanyl)hexane-1-thiole (formula V) is illustrated.

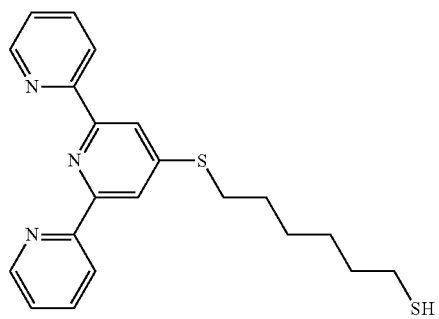

(V)

Synthesis of 6-(2,2';6',2"-terpyridin-4'-ylsulfanyl)hexane-1-thiol

The terpyridine of formula V was obtained in a 4 step reaction using literature procedures [U. S. Schubert, C. Eschbaumer, O. Hien, P. R. Andres, *Tetrahedron Lett.* 2001, 42, 4705; U. S. Schubert, S. Schmatloch, A. A. Precup, *Designed Monomers and Polymers* 2002, 5, 211.]. The yield and analysis at each step was as follows:

Step 1: 1,5-bis-(2'-pyridyl)-1,3,5-tricarbonyl pentane

Ethylpicolinate was reacted with acetone in the presence of NaH in tetrahydrofuran. The reaction mixture was refluxed for eight hours.

Yield: 41% yellow crystals $^1$H-NMR (CDCl$_3$/300 MHz): δ[ppm]: 2.10 (s, 4H); 7.24 (s, CDCl3); 7.40-7.44 (m, 2H); 7.84-7.95 (m, 4H); 8.76-8.77 (m, 2H)

Step 2: 2,6-bis-(2'-pyridyl)-4-pyridone

The product of step 1 was reacted with ammonium acetate with a 48 hour reflux.

Yield: 67% light pink crystals $^1$H-NMR (CDCl$_3$/300 MHz): δ[ppm]: 6.77 (s, 2H); 7.24 (s, CDCl3); 7.36-7.38 (m, 2H); 7.77-7.86 (m, 4H); 8.64-8.66 (m, 2H)

Step 3: 4'-chloro-2,2';6',2"-terpyridine

The product of step 2 was reacted with potassium pentachloride in phosphoryl chloride with a 24 hour reflux.

Yield: 55% light purple $^1$H-NMR (CDCl$_3$/300 MHz): δ[ppm]: 7.24 (s, CDCl3); 7.80-7.86 (m, 2H); 8.46 (s, 2H); 8.55 (t, 2H); 8.58 (t, 2H); 8.66-8.69 (m, 2H)

Step 4: 6-(2,2';6',2"-terpyridin-4'-ylsulfanyl)hexane-1-thiol

The product of step 3 was reacted with 1,6-hexanedithiol in the presence of potassium hydroxide in dimethylsulfoxide.

Yield: 35% colorless crystals $^1$H-NMR (CDCl$_3$/300 MHz): δ[ppm]: 1.32-1.63 (m, 4H), 1.79-1.88 (m, 4H), 3.63 (q, 2H), 4.7 (t, 2H), 7.24 (s, CDCl3); 7.27-7.32 (m, 2H); 7.78-7.84 (m, 2H); 7.96 (s, 2H); 8.56-8.65 (m, 4H)

The styrene butadiene rubber of Example 1 was functionalized with 6-(2,2;6',2"-terpyridin-4'-ylsulfanyl)hexane-1-thiol following the procedures of Example 1 for 2-mercaptonaphthalene.

Figure 7:
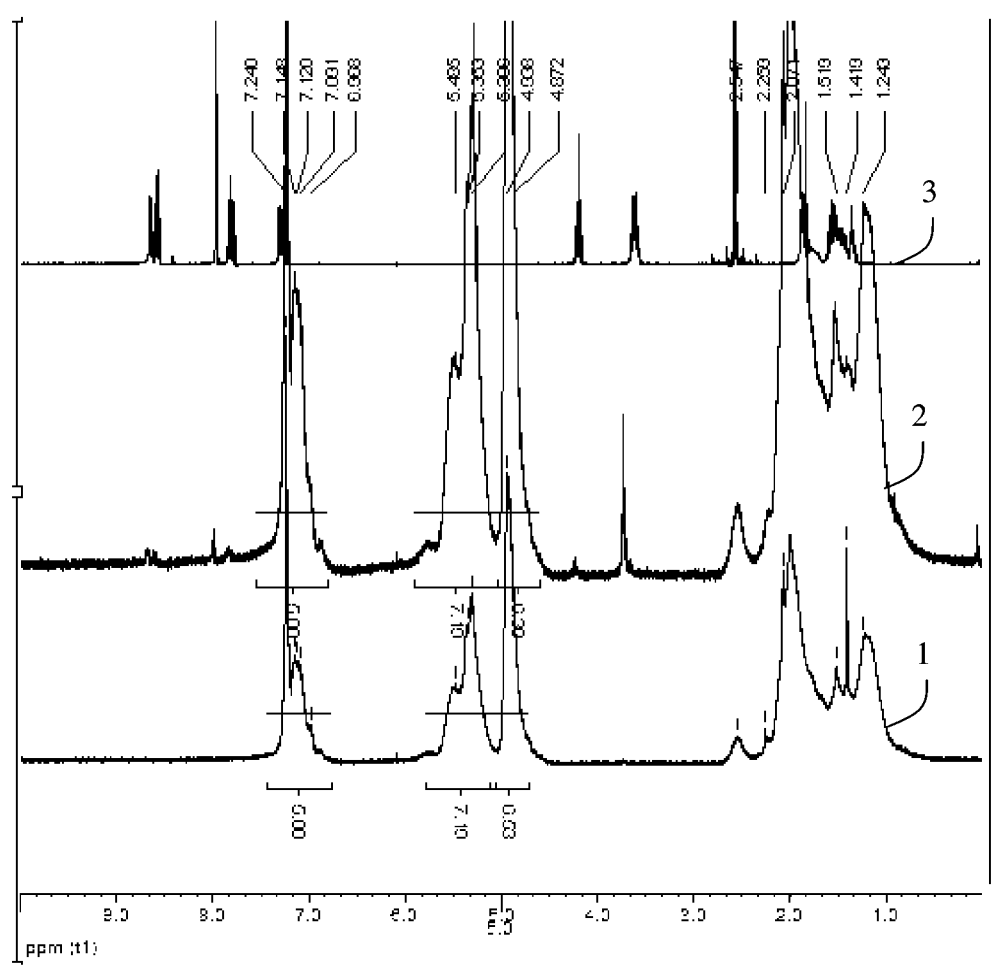
FIG. 7 shows an $^1$H-NMR of an unfunctionalized styrene-butadiene elastomer compared to the elastomer functionalized with a terpyridine ligand.
Figure 8:
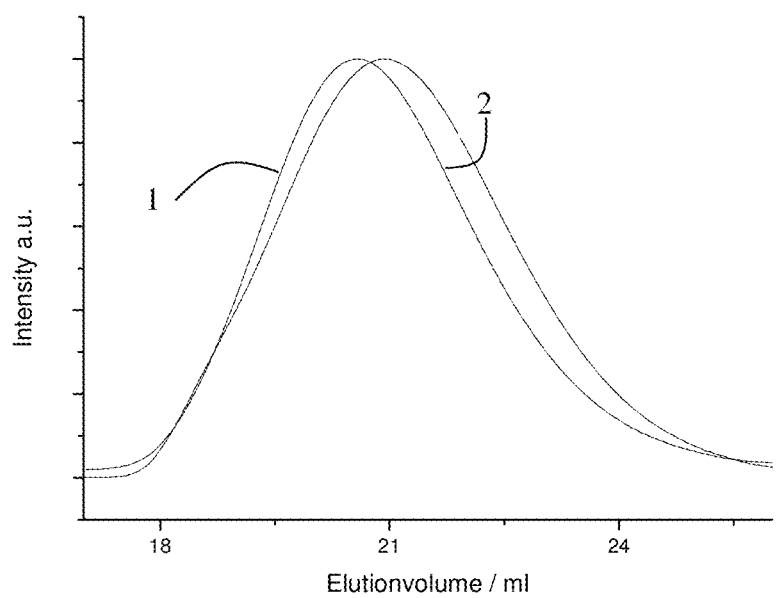
FIG. 8 shows a GPC graph for an unfunctionalized styrene-butadiene elastomer compared to the elastomer functionalized with a terpyridine ligand.

FIG. 7 shows the $^1$H-NMR of the unfunctionalized elastomer (1) compared to the rubber functionalized with the terpyridine ligand (2), and the terpyridine (3). As seen in FIG. 7, a small amount of the ligand has reacted with the vinyl groups of the elastomer. Very small signals in the aromatic region of the functionalized rubber spectrum (2) between 8 and 9 ppm belonging to the hydrogen of the ligand can be observed, indicating a successful functionalization. FIG. 8 shows a GPC graph for the SBR (1) and the functionalized SBR (2). As seen in FIG. 8, essentially no change in molecular weight could be observed in the GPC measurement, so that the reduction of vinyl protons can be assigned to functionalization.

Example 3

In this example, functionalization of a styrene-butadiene rubber with 4'-mercapto-2,2':6',2"-terpyridine (formula VI) is illustrated

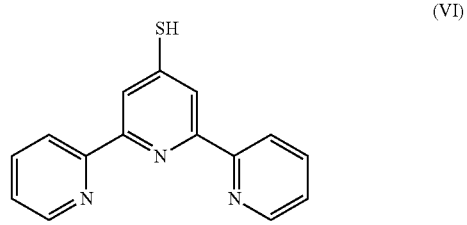 [SMILES: Sc1cc(-c2ccccn2)nc(-c2ccccn2)c1]

(VI)

Synthesis of -4'-mercapto-2,2':6',2"-terpyridine

The terpyridine of formula VI was obtained using the 4 step procedure as given in Example 2, with the modification that in step 4, the 4'-chloro-2,2';6',2"-terpyridine product of step 3 was reacted with sodium hydrogensulfide (NaSH) in the presence of potassium hydroxide in dimethylformamide (DMF).

Yield: 88%

The styrene butadiene rubber of Example 1 was functionalized with 4'-mercapto-2,2':6',2"-terpyridine following the procedures of Example 1 for 2-mercaptonaphthalene.

Figure 9:
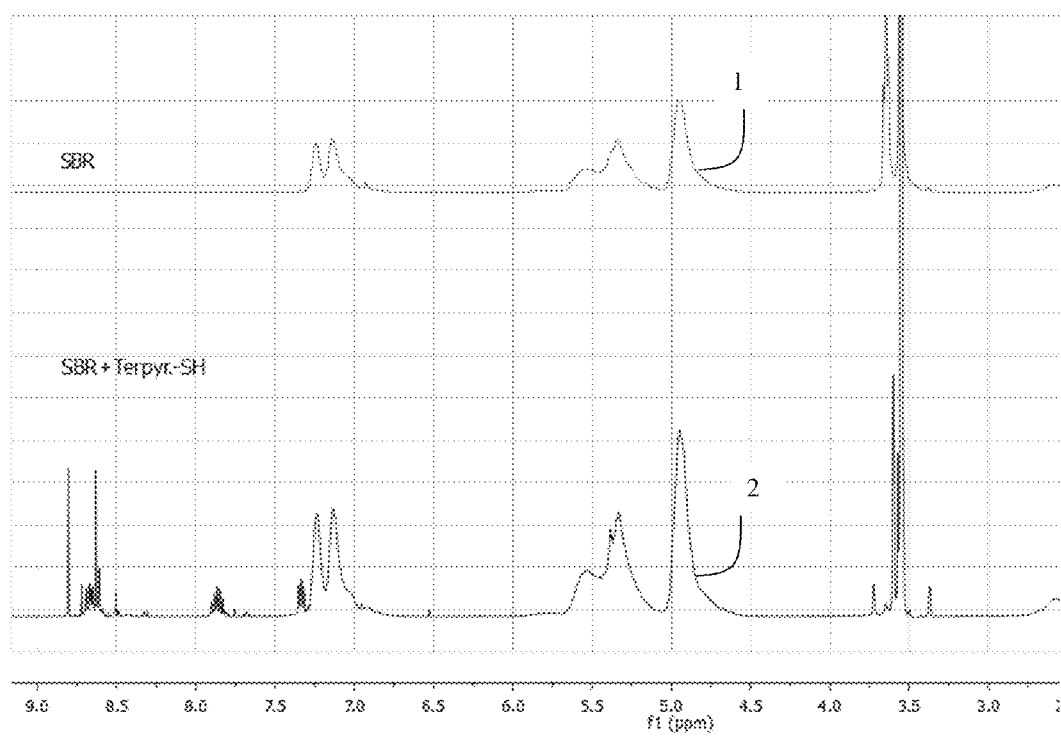
FIG. 9 shows an $^1$H-NMR of an unfunctionalized styrene-butadiene elastomer compared to the elastomer functionalized with a terpyridine ligand.

FIG. 9 shows the $^1$H-NMR of the unfunctionalized elastomer (1) compared to the rubber functionalized with the terpyridine ligand (2). As seen in FIG. 9, a small amount of the ligand has reacted with the vinylgroups of the elastomer. Very small signals in the aromatic region of the functionalized rubber spectrum (2) between 8 and 9 ppm belonging to the hydrogen of the ligand can be observed, indicating a successful functionalization.

Example 4

In this example, functionalization of a styrene-butadiene rubber with 4'-(4-mercaptomethylphenyl)-2,2':6,2"-terpyridine (formula VII) is illustrated.

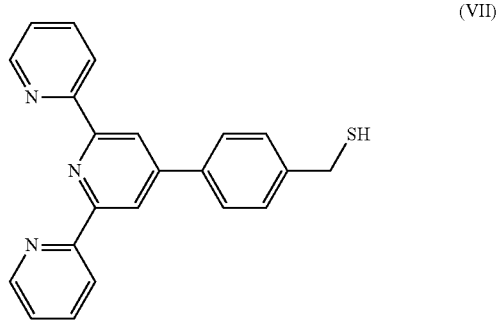 [SMILES: SCc1ccc(-c2cc(-c3ccccn3)nc(-c3ccccn3)c2)cc1]

(VII)

Synthesis of 4'-(4-mercaptomethylphenyl)-2,2':6,2"-terpyridine

Figure 10:
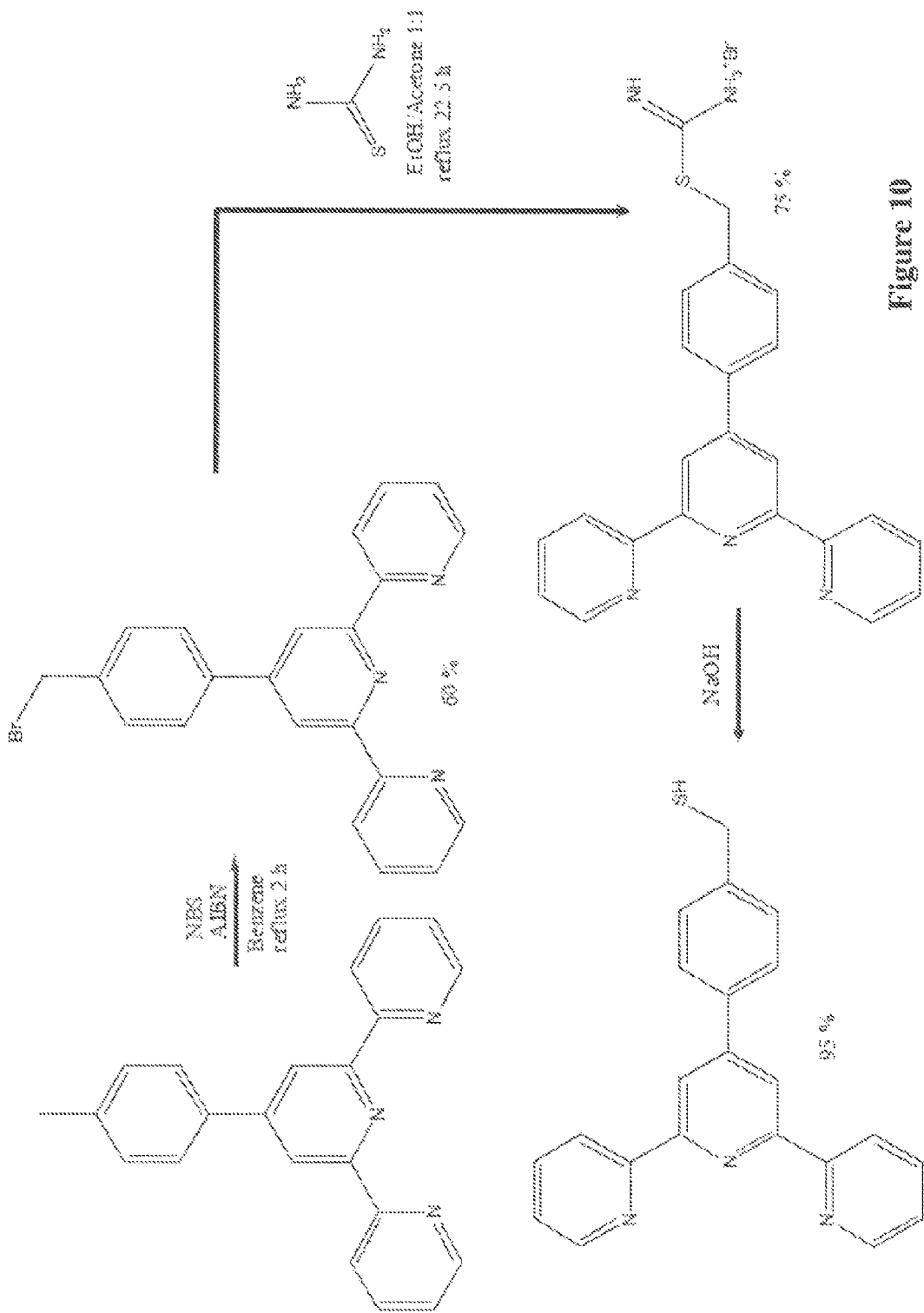
FIG. 10 a synthesis scheme for synthesis of a terpyridine ligand.

The terpyridine of formula VII was obtained following a synthesis route as shown in FIG. 10.

Step 1: 4'-methylphenyl-2,2':6,2"-terpyridine

[X. J. Zhang, D. Li, X. P. Zhou, *New J. Chem.* 2006, 30, 706.]

4.6 g (0.115 mol) NaOH was mixed with 6.4 g (0.05 mol) p-tolylaldehyde and 12.8 g (0.10 mol) 2-acetylpyridine in a mortar, until a yellow powder was produced. The powder was transferred to a flask which contained 35 g ammonia acetate (excess) and 90 ml acetic acid (100%). The mixture was heated under reflux for three hours. Afterwards 50 ml ethanol and 68 ml water were added. Upon cooling the red solution the product crystallized. It was recrystallized from ethanol twice.

Yield: 65% light yellow crystals $^1$H-NMR (CDCl$_3$/300 MHz): δ[ppm]: 2.41 (s, 3H); 7.29-7.37 (m, 4H); 7.81 (d, 2H); 7.87 (td, 2H); 8.66 (d, 2H); 8.71-8.73 (m, 4H)

Step 2: 4'-(4-bromomethylphenyl)-2,2':6,2"-terpyridine 7.07 g 4'-methylphenyl-2,2':6,2"-terpyridine, 0.28 g AIBN and 4.67 g N-Bromsuccinimide were dissolved in 70 ml benzene and heated under reflux for 6 hours.

The resulting suspension was filtered hot to remove the succinimide. The solvent of the filtrate was evaporated and the resulting solid was recrystallized from ethanol/acetone 2:1.

Yield: 60% dark yellow crystals $^1$H-NMR (CDCl$_3$/300 MHz): δ[ppm]: 4.55 (s, 2H); 7.33-7.38 (m, 2H); 7.52 (d, 2H); 7.85-7.92 (m, 4H); 8.66 (td, 2H); 8.71-8.73 (m, 4H)

Step 3: 4'-(4-isothiouroniumbromidemethylphenyl)-2,2':6,2"-terpyridine

This step was carried out according to the literature procedure [G. C. Zhou, Harruna, II, *Macromolecules* 2005, 38, 4114]

Yield: 75%.

Step 4: 4'-(4-mercaptomethylphenyl)-2,2':6,2"-terpyridine

This step was carried out according to the literature procedure [G. C. Zhou, Harruna, II, *Macromolecules* 2005, 38, 4114].

Yield: 95%

$^1$H-NMR (CDCl$_3$/300 MHz): δ[ppm]: 3.69 (s, 2H); 7.28-7.38 (m, 4H); 7.81-7.88 (m, 4H); 8.61-8.70 (m, 6H)

The styrene butadiene rubber of Example 1 was functionalized with 4:4'-(4-mercaptomethylphenyl)-2,2':6,2"-terpyridine following the procedures of Example 1 for 2-mercaptonaphthalene.

Figure 11:
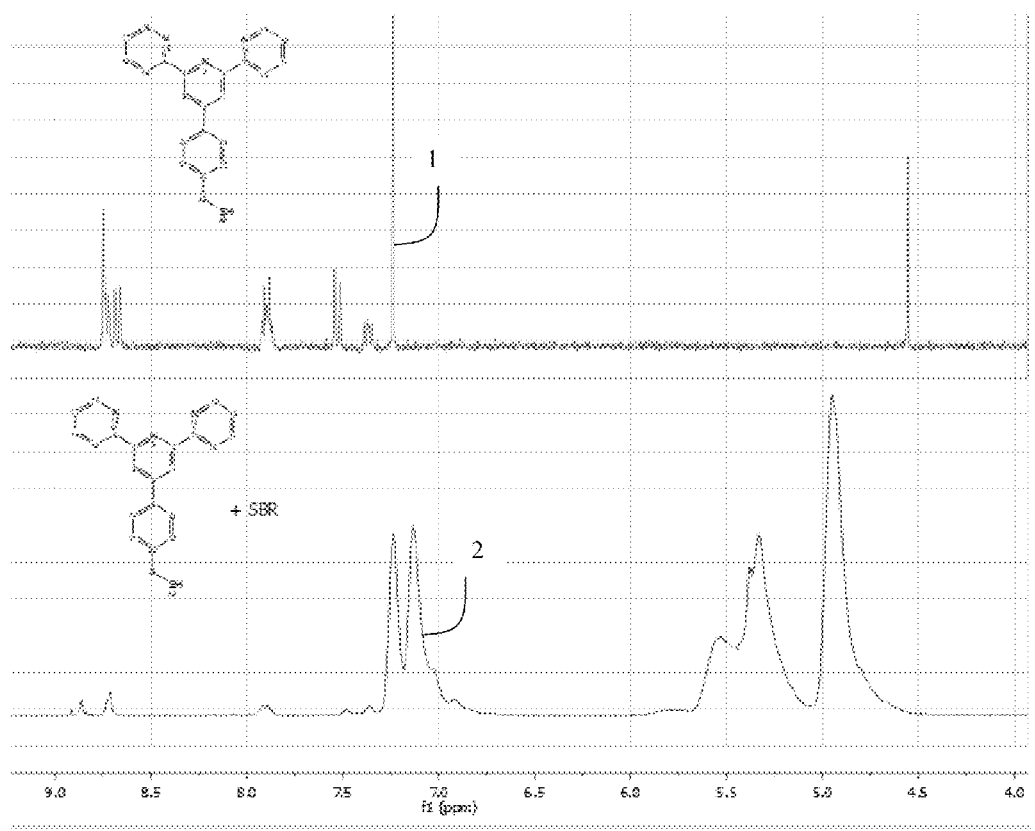
FIG. 11 shows an $^1$H-NMR of a terpyridine ligand compared to a styrene-butadiene elastomer functionalized with the terpyridine ligand.

FIG. 11 shows the $^1$H-NMR of the rubber functionalized with the terpyridine ligand (2), and the terpyridine (1). As seen in FIG. 11, a small amount of the ligand has reacted with the vinylgroups of the elastomer. Very small signals in the aromatic region of the functionalized rubber spectrum (2) between 8 and 9 ppm belonging to the hydrogen of the ligand can be observed, indicating a successful functionalization.

Example 5

In this example, the effect of adding a iron salt to a functionalized elastomer is illustrated. A rubber cement was prepared by adding 0.4 g of the functionalized elastomer of Example 4 to 4 ml of THF in a small vial. The rubber cement was combined with 0.02 g of FeSO$_4$.7H$_2$O and the vial was shaken for 7 hours. Visual inspection of the rubber cement/metal salt mixture showed a purple color, as compared with the colorless rubber cement.

Figure 12:
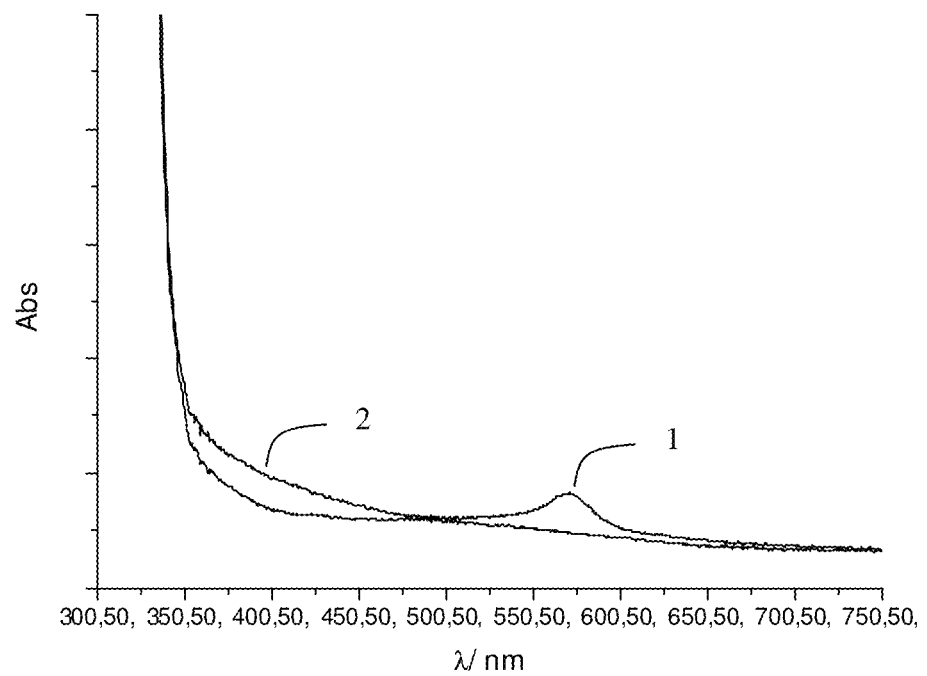
FIG. 12 shows UV-vis spectra for a rubber cement/iron salt mixture and for rubber cement.

UV-vis spectra for the rubber cement/metal salt and rubber cement are shown in FIG. 12. As seen in FIG. 12, the rubber cement/metal salt spectrum (2) shows an absorbance peak at about 571 nm, indicating the formation of a coordination complex between the terpyridine moieties of the functionalized elastomer and the Fe$^{2+}$ ion. The rubber cement spectrum (1) shows no such peak.

Example 6

In this example, the effect of adding a ruthenium salt to a functionalized elastomer is illustrated. A rubber cement was prepared by adding 0.03 g of the functionalized elastomer of Example 4 to 5 ml THF and 0.25 ml MeOH in a small vial. The rubber cement was combined with 0.02 g of RuCl$_3$ and the vial was heated up to 65° C. for 20 hours and shaken. Visual inspection of the rubber cement/metal salt mixture showed a dark red color, as compared with the colorless rubber cement.

Figure 13:
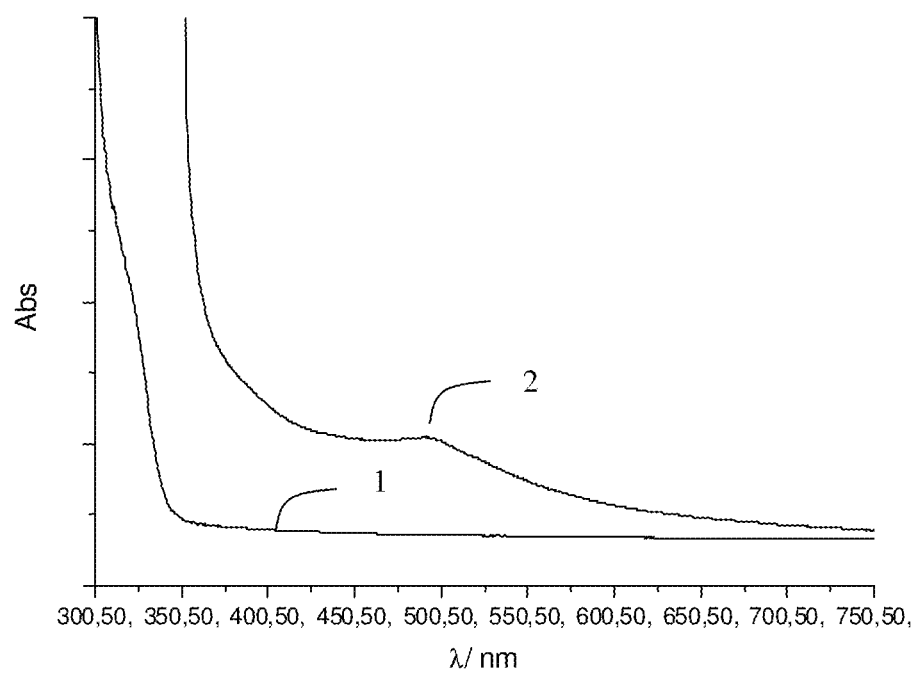
FIG. 13 shows UV-vis spectra for a rubber cement/ruthenium salt mixture and for a rubber cement.

UV-vis spectra for the rubber cement/metal salt and rubber cement are shown in FIG. 13. As seen in FIG. 13, the rubber cement/metal salt spectrum (2) shows an absorbance peak at about 490 nm, indicating the formation of a coordination complex between the terpyridine moieties of the functionalized elastomer and the Ru$^{2+}$ ion. The rubber cement spectrum (1) shows no such peak.

What is claimed is:

1. A functionalized diene-based elastomer of formula I $$X \!-\!\! \left[ Y \!-\! Z \right]_n$$ (I)

where X is a polymer derived from a monomer comprising at least one conjugated diene monomer and optionally at least one vinyl aromatic monomer;

Z comprises a multidentate ligand group capable of complexing with a metal ion, the multidentate ligand selected from the group consisting of a substituted bipyridinyl groups, unsubstituted bipyridinyl groups, substituted terpyridinyl groups, unsubstituted terpyridinyl groups, substituted phenanthrolinyl groups, and unsubstituted phenanthrolinyl groups;

Y is a divalent group bonded to both X and Z, where Y is divalent sulfur; and n is the number of —[Y—Z] groups bonded to X.

2. The functionalized diene-based elastomer of claim 1, wherein Z comprises a ligand of formula II, III or IV

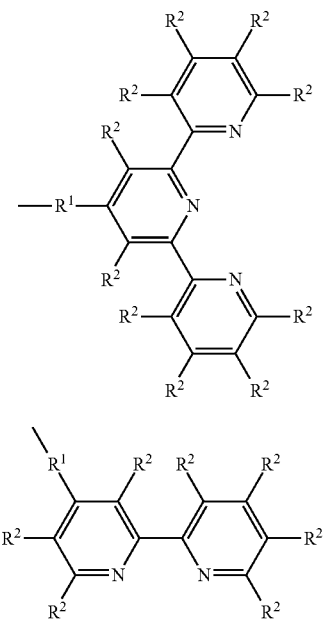

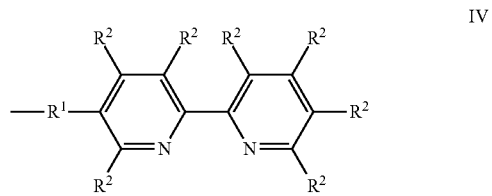

where $R^1$ forms the linkage from Z to Y in formula I and $R^1$ is a covalent bond, C2 to C8 linear alkylene, arylene, alkyl substituted arylene, aryl substituted alkylene, thioalkylene, or thioarylene, and $R^2$ are independently selected from the group consisting of hydrogen, C2 to C6 linear alkyl, and C2 to C6 branched alkyl.

3. The functionalized diene-based elastomer of claim 1, wherein Z comprises a ligand selected from the group consisting of substituted 2,2';6',2"-terpyridinyl groups, unsubstituted 2,2';6',2"-terpyridinyl groups, substituted 2,2'-bipyridinyl groups, and unsubstituted 2,2'-bipyridinyl groups.

4. The functionalized diene-based elastomer of claim 1, wherein —[Y—Z] group is selected from the group consisting of 6-(2,2';6',2"-terpyridin-4'-ylsulfanyl)hexyl-1-sulfanyl, 2,2';6',2"-terpyridin-4'-ylsulfanyl, and 4-(2,2';6',2"-terpyridin-4'-yl)phenylmethylsulfanyl.

5. The functionalized diene-based elastomer of claim 1, wherein X is selected from the group consisting of styrene-butadiene rubbers, polybutadiene rubbers, and polyisoprene rubbers.

6. The functionalized diene-based elastomer of claim 1, wherein n ranges from 2 to 30.

* * * * *